(12) United States Patent
Cote

(10) Patent No.: US 11,350,612 B2
(45) Date of Patent: Jun. 7, 2022

(54) CONNECTION SYSTEM FOR BIRD FEEDER

(71) Applicant: BROME BIRD CARE INC., Knowlton (CA)

(72) Inventor: Paul L. Cote, Knowlton (CA)

( * ) Notice: Subject to any disclaimer, the term of this patent is extended or adjusted under 35 U.S.C. 154(b) by 91 days.

(21) Appl. No.: 16/752,258

(22) Filed: Jan. 24, 2020

(65) Prior Publication Data

US 2021/0227797 A1 Jul. 29, 2021

(51) Int. Cl.
*A01K 39/01* (2006.01)

(52) U.S. Cl.
CPC .............................. *A01K 39/0113* (2013.01)

(58) Field of Classification Search
CPC .......................... A01K 39/012; A01K 39/0113
USPC .................. 119/57.8, 52.3, 51.01, 52.2, 57.9
See application file for complete search history.

(56) References Cited

U.S. PATENT DOCUMENTS

| | | | | |
|---|---|---|---|---|
| 4,102,308 A * | 7/1978 | Kilham | ............... | A01K 39/0113 119/52.3 |
| 4,201,155 A * | 5/1980 | Hyde, Jr. | ............. | A01K 39/012 119/57.8 |
| 5,791,286 A * | 8/1998 | Taussig | ................ | A01K 39/012 119/52.2 |
| 2006/0016400 A1* | 1/2006 | Rich | .................... | A01K 39/012 119/57.8 |
| 2014/0150725 A1* | 6/2014 | Moone | ................. | A01K 39/012 119/57.8 |

* cited by examiner

*Primary Examiner* — Yvonne R Abbott-Lewis
(74) *Attorney, Agent, or Firm* — Andrews Robichaud PC; Alessandro Colonnier

(57) ABSTRACT

The present disclosure provides an improved connection system for use between a baffle and a seed tube of a bird feeder. The seed tube is further comprised of a plurality of tracks to receive a corresponding plurality of latches of the baffle. The tracks are generally L-shaped and have a tapered portion to better receive and compress the latches. The seed tube is also comprised of two recesses, each having a projection therein, the projections positioned on a pivotable surface. The projections of the seed tube are constructed to mate with corresponding openings that are positioned on raised portions of the baffle. Once the projections are inserted into the openings, the connection system is in a locked position and the baffle mates flushly and tightly with the seed tube.

8 Claims, 5 Drawing Sheets

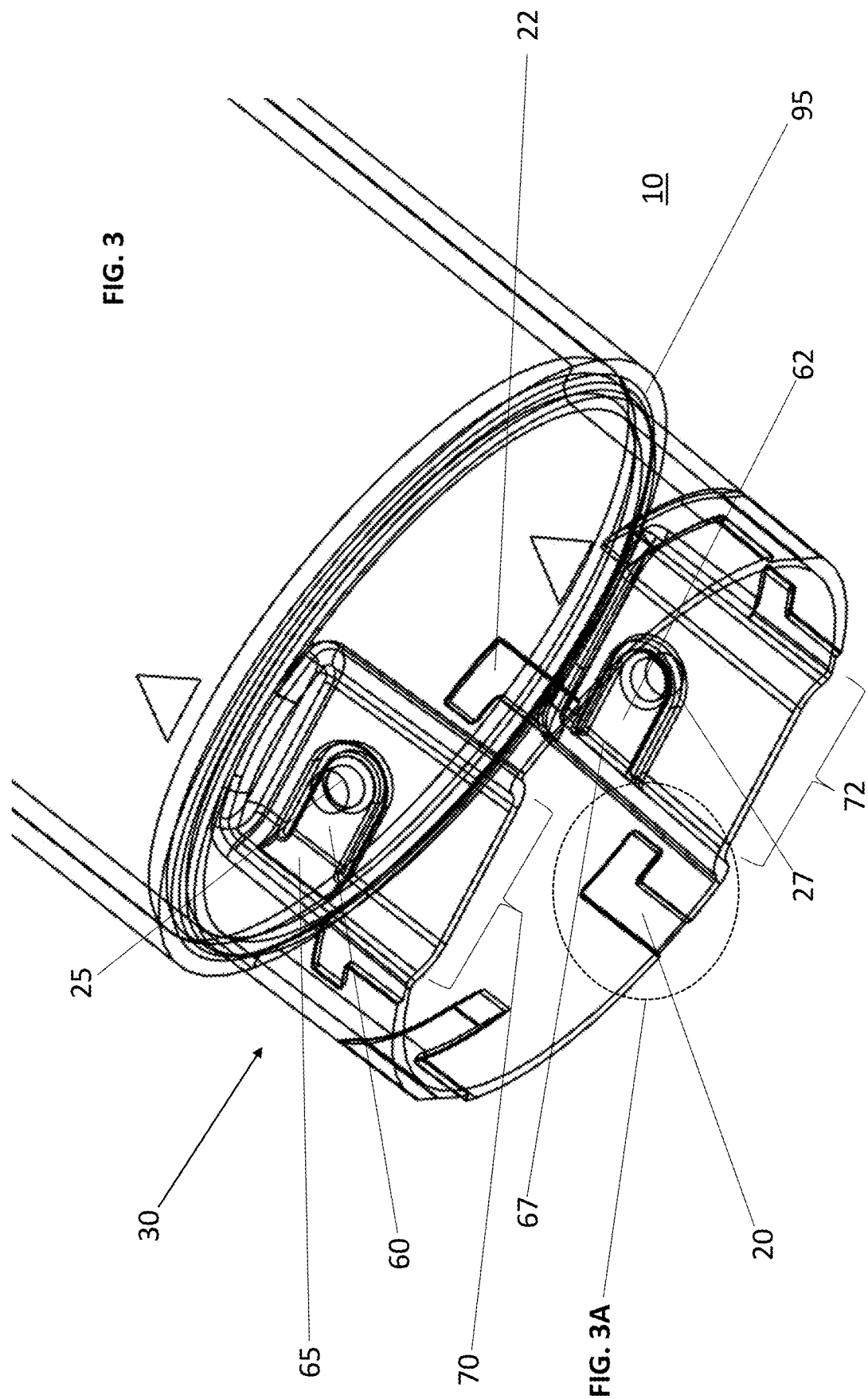

CONNECTION SYSTEM FOR BIRD FEEDER

FIELD

The disclosure relates to the field of bird feeding accessories, and more specifically to an improved connection system for bird feeders.

BACKGROUND

Bird feeders have been around for quite some time for bird watchers and animal lovers. However, squirrels are and have always been the source of problems for bird feeders as they try and gain access to feed within bird feeders, thereby damaging them. U.S. Pat. No. 6,543,384 (Cote) is designed to prevent squirrels from accessing bird feed, while being easy to assemble and disassemble. However, the connection between the seed tube and the baffle in Cote can sometimes leave a gap or stepped portion and does not provide a flush connection at the seam. This flush connection is desirous as squirrels claw or otherwise damage the stepped portion between the seed tube and baffle. Having a flush connection means that squirrels are prevented from gaining a grip at the seam.

As such, there is a need for an improved connection system between the baffle and the seed tube that will eliminate any gap between the two parts and prevent squirrels from gaining a grip with their claws at the seam.

SUMMARY

In an aspect, the present disclosure provides an improved connection system for use with bird feeders comprising: a seed tube for holding bird feed, the seed tube further comprising: at least two tracks, the tracks generally L-shaped; and, at least two pivotable projections; and, a baffle connected to the seed tube, the baffle comprising: at least two latches to be guided along the at least two tracks; and, at least two openings to receive the at least two pivotable projections, wherein the at least two latches follow the at least two tracks until the at least two pivotable projections are locked into the corresponding at least two openings; and wherein the seed tube mates flushly with the baffle to prevent a squirrel from gaining a grip at a seam between the baffle and the seed tube.

BRIEF DESCRIPTION OF THE DRAWINGS

The following figures serve to illustrate various embodiments of features of the disclosure. These figures are illustrative and are not intended to be limiting.

FIG. 3 is an enlarged perspective transparent view of a lower end of the seed tube for use in a bird feeder, according to an embodiment of the present disclosure;

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
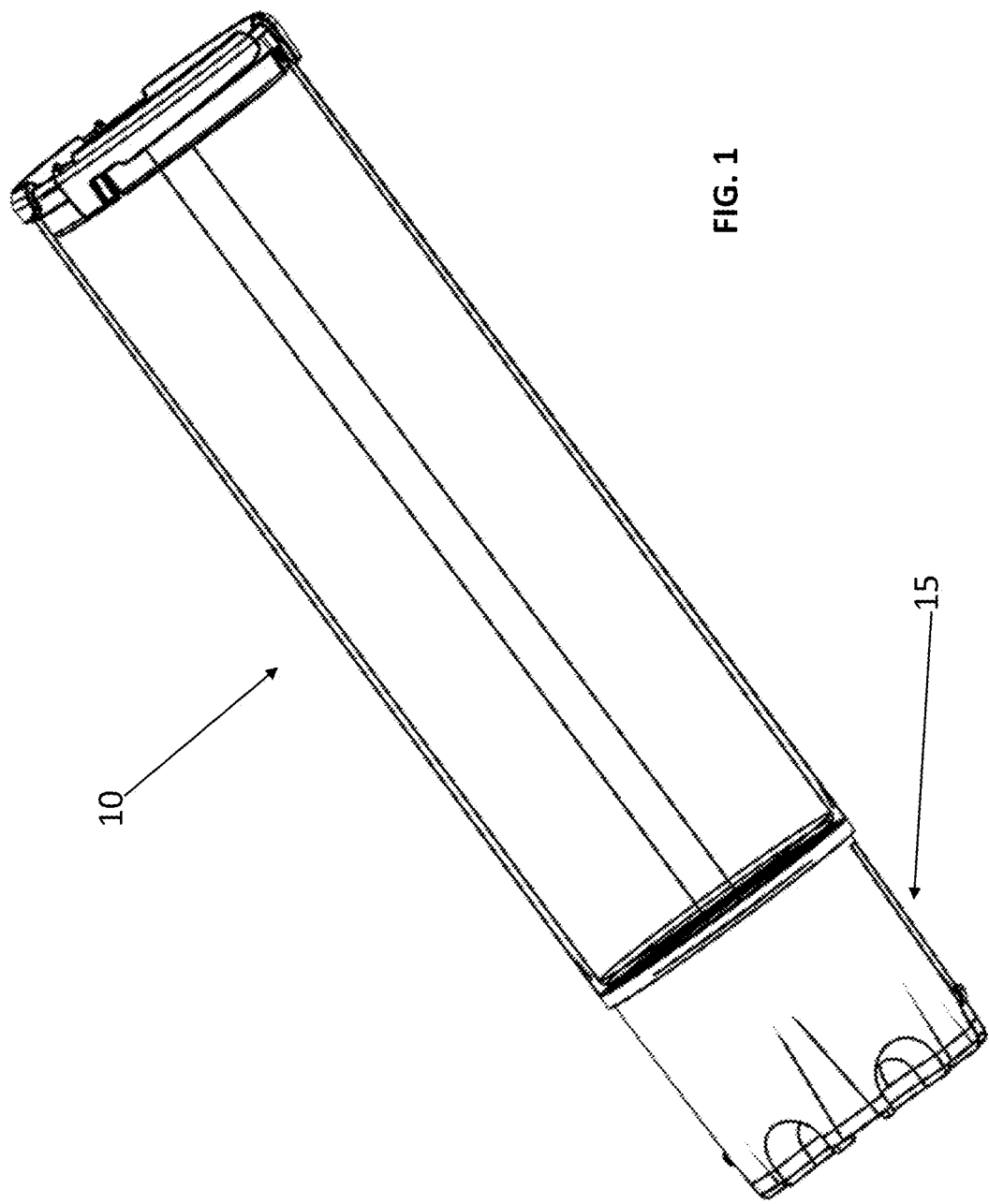
FIG. 1 is a perspective view of a seed tube connected to a baffle using a connection system for use in a bird feeder, according to an embodiment of the present disclosure.
Figure 2:
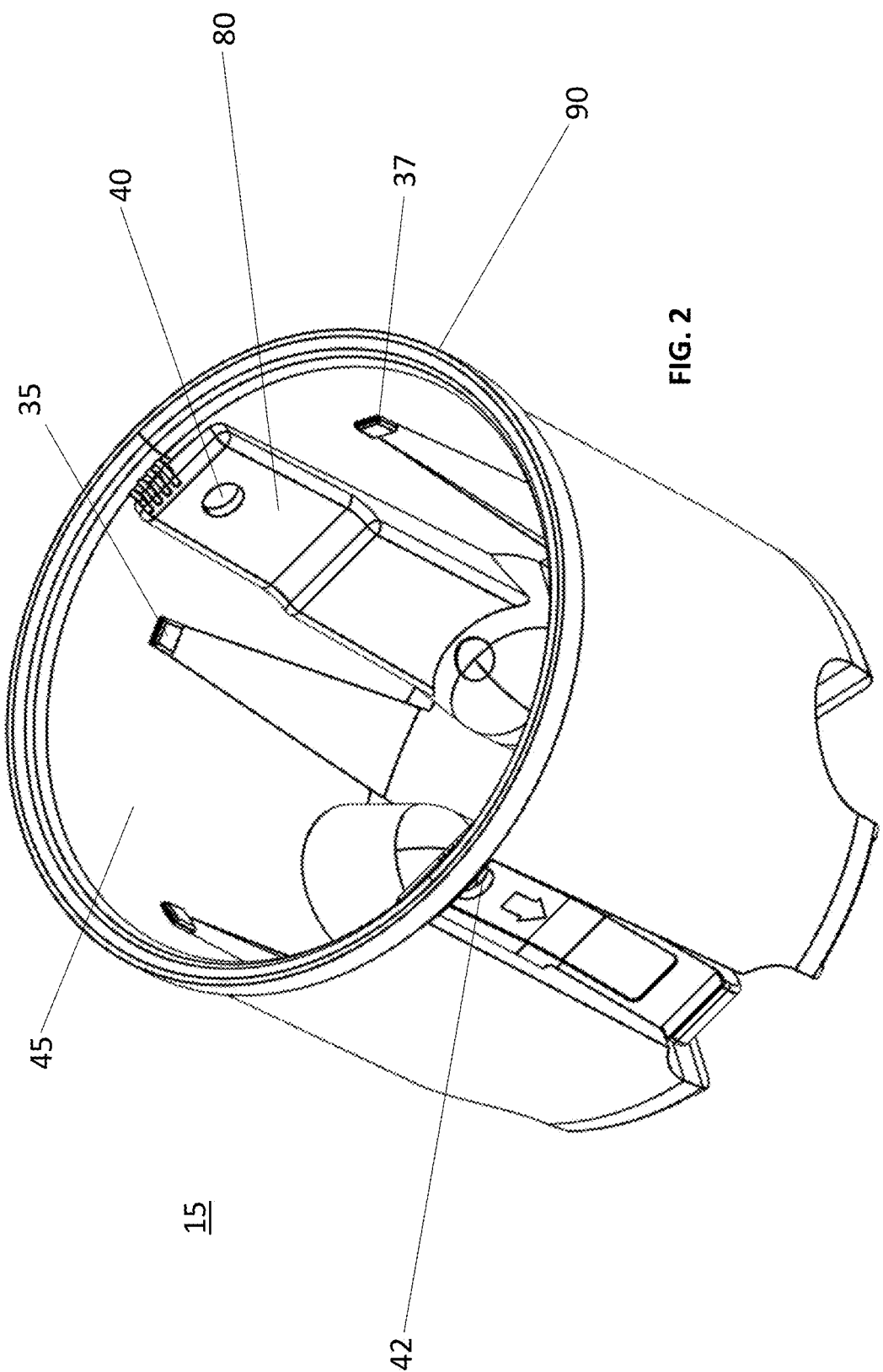
FIG. 2 is a perspective view of the baffle for use in a bird feeder, according to an embodiment of the present disclosure.
Figure 3A:
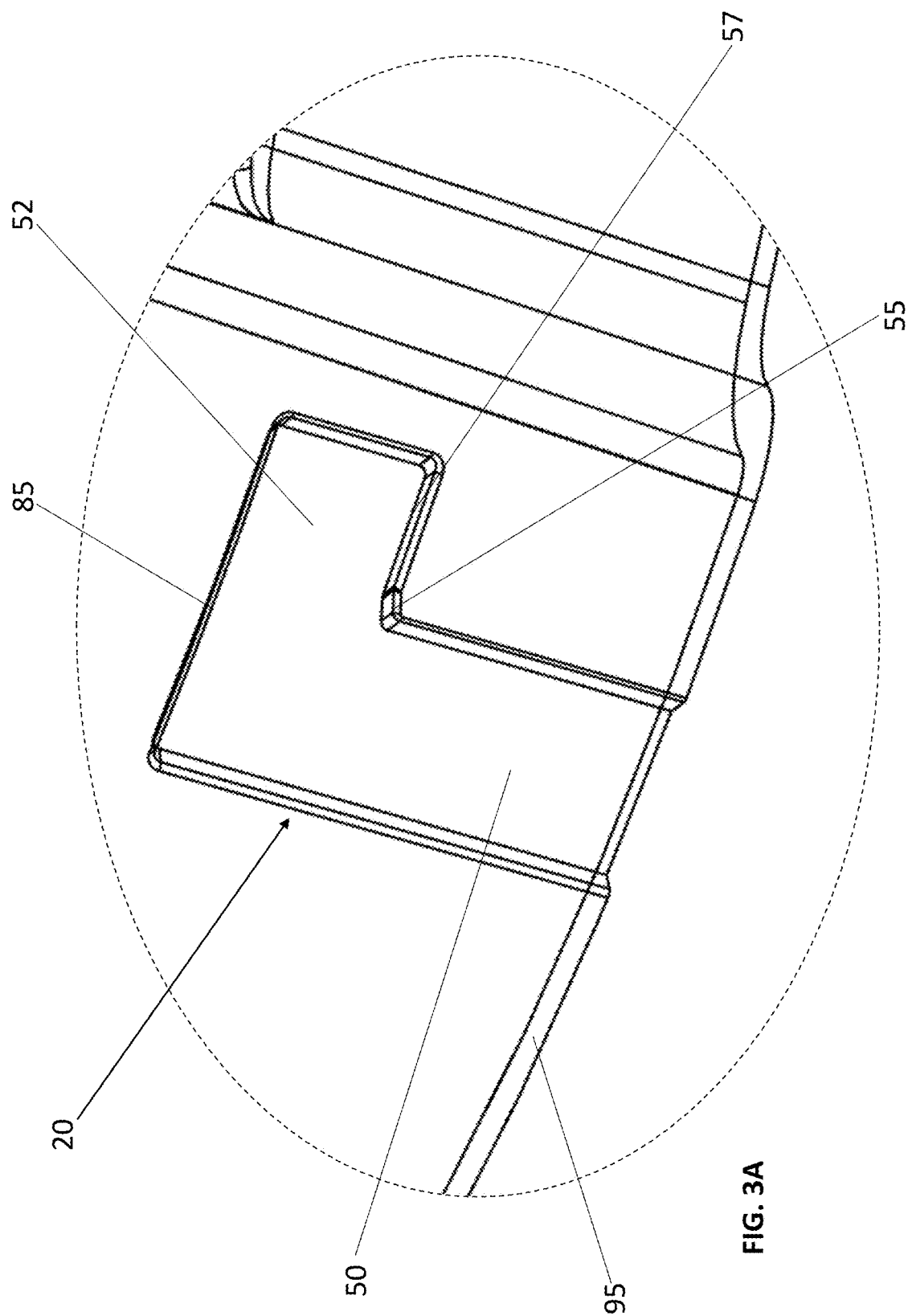
FIG. 3A is an enlarged perspective view of a track taken along the lines in FIG. 3, according to an embodiment of the present disclosure; and, FIG. 4 is a cross-sectional perspective view of the connection system to secure the baffle to the seed tube for use in a bird feeder, according to an embodiment of the present disclosure.
Figure 4:
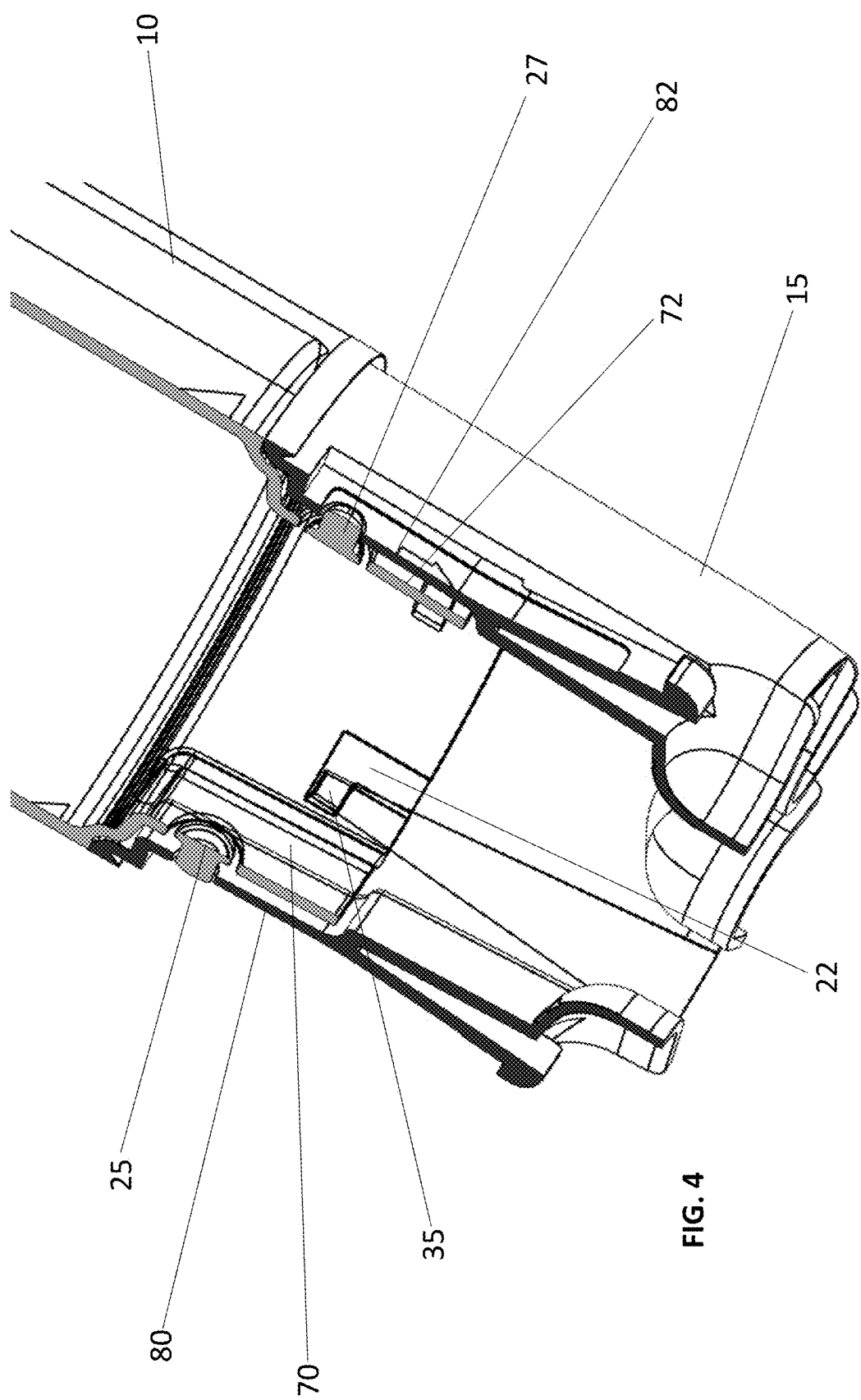

With reference to FIGS. 1, 2, 3, 3A and 4 and according to an embodiment of the present disclosure, a seed tube 10 is shown secured to a baffle 15. It is an object of the present disclosure to have the seed tube 10 mate flushly with the baffle 15, so that a squirrel or other similar animal cannot grip the connecting area between the seed tube 10 and baffle 15. To achieve an improved connection, an improved connection system is utilized, preferably comprised of at least two tracks 20, 22 and at least two pivotable projections 25, 27 positioned on a lower end 30 of the seed tube 10. The improved connection system is also preferably comprised of at least two latches 35, 37 to mate with the tracks 20, 22 as well as at least two corresponding openings 40, 42 positioned on an inside surface 45 of the baffle 15 to mate with corresponding projections 25, 27. A worker skilled in the art would appreciate that although six latches and six corresponding tracks are shown, only two are necessary in the present disclosure. In a preferred embodiment, the tracks 20, 22 are generally L-shaped, having a first vertical track 50 and a second horizontal track 52. As best shown in FIG. 3A, a tapered portion 55 is provided in between the first vertical and second horizontal tracks 50, 52 to facilitate the travel of the corresponding latches 35, 37. The second horizontal track 52 is also comprised of a tapered lower wall 57, the tapered lower wall 57 tapered upwardly toward upper wall 85 to compress the latches 35, 37 into the second horizontal track 52 and prevent the latches 35, 37 from becoming loose once the baffle 15 is secured to the seed tube 10. Indeed, the latches 35, 37 slide and are compressed into the second horizontal track 52 until projections 25, 27 lock into the corresponding apertures 40, 42. The projections 25, 27 are preferably positioned on pivotable surfaces 60, 62 respectively. The pivotable surfaces 60, 62 in turn pivot about base portions 65, 67, respectively. Together, the projection 25 and pivotable surface 60 are positioned within a first recess 70 of the lower end 30 of the seed tube 10, while projection 27 and pivotable surface 62 are positioned within a second recess 72 of the lower end 30 of the seed tube 10. The projections 25, 27 of the seed tube 10 are constructed and arranged to fit into corresponding openings 40, 42 of the baffle 15. Opening 40 is positioned on a first raised portion 80 of the inside surface 45 of the baffle 15, while the opening 42 is positioned on a second raised portion 82 of the inside surface 45 of the baffle 15. To connect the seed tube 10 to the baffle 15, the lower end 30 of the seed tube 10 is inserted into the upper opening of the baffle 15. The first and second recesses 70, 72 are aligned with first and second raised portions 80, 82, respectively. In turn, this aligns the plurality of latches 35, 37 into corresponding tracks 20, 22. The latches 35, 37 follow the tracks 20, 22 into the first vertical track 50, until an upper circumferential lip 90 of the baffle 15 mates flushly at the seam with a lower circumferential lip 95 of the seed tube 10. The baffle 15 is then rotated, which in turn forces the latches 35, 37 over the tapered portion 55 and onto the second horizontal track 52. At the same time, the projections 25, 27 are slid laterally and into the corresponding openings 40, 42. At this moment, the connection system is in its locked position as shown in FIG. 4. In the locked position, the upper circumferential lip 90 of the baffle 15 is mated flushly at the seam with the lower circumferential lip 95 of the seed tube 10. This connection eliminates any gap that would allow squirrels or other small animals to grip onto this seam portion of the bird feeder to gain access to the bird feed. To unlock the seed tube 10 from the baffle 15, the projections 25, 27 are pushed inwardly while the baffle 15 is rotated in a manner whereby the latches 35, 37 move out of the second horizontal track 52 and into the first vertical track 50. At this point the seed tube 10 can be withdrawn from the baffle 15 by pulling one away from the other.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. An improved connection system for use with bird feeders comprising:
   a seed tube for holding bird feed, the seed tube further comprising:
      at least two tracks, the tracks generally L-shaped; and,
      at least two pivotable projections; and,
   a baffle connected to the seed tube, the baffle comprising:
      at least two latches to be guided along the at least two tracks; and,
      at least two openings to receive the at least two pivotable projections,
   wherein the at least two latches follow the at least two tracks until the at least two pivotable projections are locked into the corresponding at least two openings;
   and wherein the seed tube mates flushly with the baffle to prevent a squirrel from gaining a grip at a seam between the baffle and the seed tube.

2. The improved connection system of claim 1 wherein the at least two pivotable projections are positioned on first and second recesses, respectively.

3. The improved connection system of claim 1 wherein the at least two tracks are further comprised of:
   a first vertical track;
   a tapered portion; and,
   a second horizontal track.

4. The improved connection system of claim 3 wherein the second horizontal track is further comprised of a tapered lower wall to compress the at least two latches.

5. The improved connection system of claim 1 wherein the at least two openings are positioned on first and second raised portions, respectively.

6. The improved connection system of claim 1 wherein the pivotable projections are positioned on pivotable surfaces.

7. The improved connection system of claim 6 wherein the pivotable surfaces are generally U-shaped and further comprised of a base portion.

8. The improved connection system of claim 1 wherein the seed tube is further comprised of a lower circumferential lip and the baffle is further comprised of an upper circumferential lip, the lower and upper circumferential lips engaging one another at the seam.

* * * * *